United States Patent
Hirai et al.

(10) Patent No.: US 10,468,662 B2
(45) Date of Patent: Nov. 5, 2019

(54) PRODUCTION METHOD AND PRODUCTION APPARATUS OF ELECTRODE FOR SECONDARY BATTERY, ELECTRODE FOR SECONDARY BATTERY, AND SECONDARY BATTERY

(71) Applicant: NEC ENERGY DEVICES, LTD., Sagamihara-shi, Kanagawa (JP)

(72) Inventors: Masanori Hirai, Kanagawa (JP); Takashi Nakajima, Kanagawa (JP); Tetsuya Sato, Kanagawa (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 269 days.

(21) Appl. No.: 15/520,249

(22) PCT Filed: Aug. 24, 2015

(86) PCT No.: PCT/JP2015/073737
§ 371 (c)(1),
(2) Date: Apr. 19, 2017

(87) PCT Pub. No.: WO2016/063612
PCT Pub. Date: Apr. 28, 2016

(65) Prior Publication Data
US 2017/0309887 A1    Oct. 26, 2017

(30) Foreign Application Priority Data
Oct. 21, 2014    (JP) .................................. 2014-214438

(51) Int. Cl.
*H01M 4/04*    (2006.01)
*H01M 10/04*    (2006.01)
(Continued)

(52) U.S. Cl.
CPC ........... *H01M 4/04* (2013.01); *H01M 4/0404* (2013.01); *H01M 10/04* (2013.01); *H01M 4/139* (2013.01); *H01M 10/0585* (2013.01)

(58) Field of Classification Search
CPC combination set(s) only.
See application file for complete search history.

(56) References Cited

U.S. PATENT DOCUMENTS 3,891,901 A * 6/1975 Booe ...................... H01G 4/232
361/305
2016/0181650 A1* 6/2016 Ide ...................... H01M 10/052
429/211

FOREIGN PATENT DOCUMENTS

JP    2001-038276 A    2/2001
JP    2003-068279 A    3/2003
(Continued)

OTHER PUBLICATIONS

JP 2006147392, Nov. 2011, Battery, machine translation. (Year: 2011).*

(Continued)

*Primary Examiner* — Kaity V Chandler
(74) *Attorney, Agent, or Firm* — Sughrue Mion, PLLC

(57) ABSTRACT

An electrode for a secondary battery including an electrode laminated assembly that has a configuration in which electrodes and a separator are laminated, includes current collector 3 and active material layer 2 formed on a surface of current collector 3. Active material layer 2 includes a thick-layer portion and a thin-layer portion that is positioned at an edge portion of the active material layer and that is smaller in thickness than the thick-layer portion, and is formed by discharging slurry containing an active material from discharge port 12*a* of die head 12 toward the surface of current collector 3, the slurry being supplied to die head 12 through coating valve 13. At the time of the formation of (Continued)

the thin-layer portion of active material layer 2, the slurry supplied through coating valve 13 having a smaller opening amount than at the time of the formation of the thick-layer portion is discharged toward current collector 3 from discharge port 12a that is closer to current collector 3 than at the time of the formation of the thick-layer portion.

12 Claims, 10 Drawing Sheets

(51) Int. Cl.
*H01M 4/139* (2010.01)
*H01M 10/0585* (2010.01)

(56) References Cited

FOREIGN PATENT DOCUMENTS

| JP | 2006-147392 A | 6/2006 |
|----|---------------|--------|
| JP | 2006-156232 A | 6/2006 |
| JP | 2010-108678 A | 5/2010 |
| JP | 2012-164470 A | 8/2012 |
| JP | 2013-140680 A | 7/2013 |
| WO | 2013/137385 A1 | 9/2013 |
| WO | 2013/187172 A1 | 12/2013 |
| WO | 2015/019514 A1 | 2/2015 |

OTHER PUBLICATIONS

JP 2006147392, Nov. 2011, Battery, oral translation of paragraphs [0027]-[0028]. (Year: 2011).*
Communication dated Apr. 5, 2018, from European Patent Office in counterpart application No. 15853553.4.
International Search Report of PCT/JP2015/073737 dated Nov. 17, 2015.
Communication issued by the Japanese Patent Office on May 28, 2019 in application No. 2016-555117.

* cited by examiner

Fig.6a₁
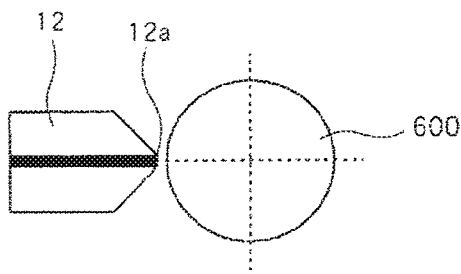
Fig.6a₂
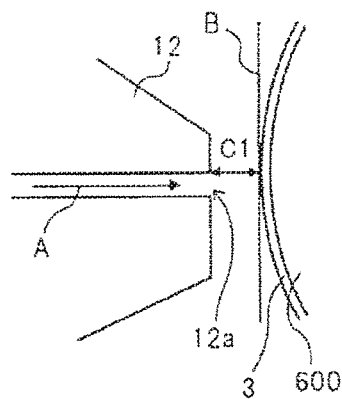
Fig.6b₁
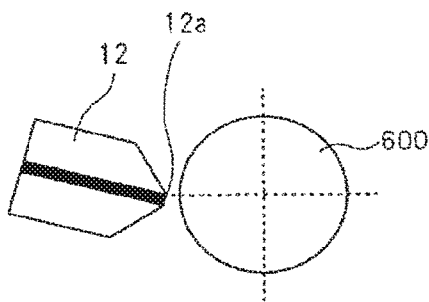
Fig.6b₂
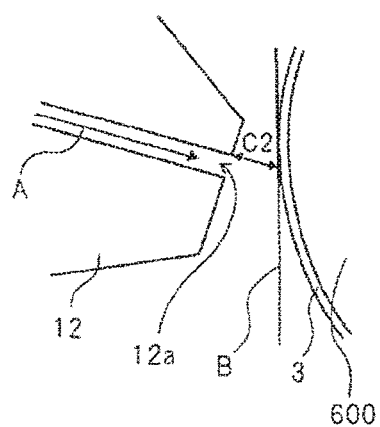

PRODUCTION METHOD AND PRODUCTION APPARATUS OF ELECTRODE FOR SECONDARY BATTERY, ELECTRODE FOR SECONDARY BATTERY, AND SECONDARY BATTERY

CROSS REFERENCE TO RELATED APPLICATIONS

This application is a National Stage of International Application No. PCT/JP2015/073737 filed Aug. 24, 2015, claiming priority based on Japanese Patent Application No. 2014-214438 filed Oct. 21, 2014, the contents of all of which are incorporated herein by reference in their entirety.

TECHNICAL FIELD

The present invention relates to a production method and production apparatus of an electrode for a secondary battery, an electrode for a secondary battery, and a secondary battery.

BACKGROUND ART

Secondary batteries have been widely spread not only as power sources of portable devices such as mobile phones, digital cameras and laptop computers but also as vehicle or household power sources. In particular, a lightweight lithium ion secondary battery with a high-energy density is an energy storage device that is indispensable for our life.

The secondary battery can be roughly categorized as a wound type or a laminated type. A battery element of the wound-type secondary battery has a structure in which a long positive electrode sheet and a long negative electrode sheet are wound multiple times in a state of being overlapped with separators respectively interposed therebetween. A battery element of the laminated-type secondary battery has a structure in which positive electrode sheets and negative electrode sheets are laminated alternately and repeatedly with separators respectively interposed therebetween. The positive electrode sheet and the negative electrode sheet each include an application portion where an active material layer (including a case of a mixture agent including a binding agent, a conductive material and the like as well as an active material) is formed on a current collector, and a non-application portion where the active material layer is not formed for the connection with an electrode terminal.

In each of the wound-type secondary battery and the laminated-type secondary battery, together with an electrolyte, the battery element is accommodated and sealed in an outer container (outer case). Then, one end of a positive electrode terminal is electrically connected with the non-application portion of the positive electrode sheet while the other end is led out of the outer container, and one end of a negative electrode terminal is electrically connected with the non-application portion of the negative electrode sheet while the other end is led out of the outer container. With yearly improvements in battery technology, the trend is for annual increase in the capacity of the secondary batteries. What this means is that, should a short circuit occur, the amount of generated heat will increase which, in turn, increases safety risks. Therefore, measures to improve battery safety become more and more important.

As an example of the safety measure, as shown in Patent Document 1, there is a technology in which an insulating member is provided at a border portion between the application portion and the non-application portion to prevent a short circuit from occurring between the positive electrode and the negative electrode. The technology disclosed in Patent Document 1 disposes, on a positive electrode current collector of the positive electrode, an insulating member that covers a border portion between an application portion where a positive electrode active material layer is formed and a non-application portion where the positive electrode active material layer is not formed. In the laminated-type secondary battery, the insulating members are repeatedly laminated at the same position in the planar view. Therefore, at the position where the insulating member is disposed, the thickness of a part of the battery element is large, and the energy density per unit volume decreases.

Further, in the secondary battery, to stabilize the electric characteristic and reliability, it is preferable to fix the battery element by a tape or the like and apply uniform pressure to the battery element. However, when the insulating member in Patent Document 1 is used in the laminated-type secondary battery, it is not possible to apply uniform pressure to the battery element due to the thickness difference between the portion where the insulating member is present and the portion where the insulating member is not present, and there is concern over causing a decrease in battery quality such as the variability in the electric characteristics and a decrease in cycle characteristics.

Patent Document 2 proposes a configuration of thinning the portion where the insulating member on the electrode (positive electrode) is disposed and thereby preventing a partial increase in the thickness of the battery element. Patent Document 2 suggests a method of continuously forming the active material on the current collector, and a method of intermittently applying the active material.

Patent Document 3 describes an intermittent supply valve that is used for the intermittent application of the active material.

CITATION LIST

Patent Document

Patent Document 1: JP2012-164470A
Patent Document 2: WO2013/187172
Patent Document 3: JP2001-38276A

SUMMARY OF INVENTION

Problem to be Solved by the Invention

In Patent Document 2, in the case where the active material layer is formed by the continuous application technique, it is common in the battery industry to form a portion where the thickness of the active material layer is small, at both edges in the width direction of the long current collector. The portion where the thickness of the active material layer is small is formed by discharging slurry containing active material particles, from portions that are provided at both edges of the discharge port of a die head to discharge the slurry and that have smaller openings than the central portion. According to this method, the portion where the thickness is small can be formed very easily. However, in a small opening portion, there is a possibility of causing a so-called "line defect" in which aggregates and other foreign substances that are present in the slurry and foreign substances that adhere to the current collector or the like are caught in the opening portion to block the opening portion, and a portion where the slurry is not applied is continuously generated.

On the other hand, in the case where the active material layer is formed by the intermittent application technique, a coating valve is provided on the pathway of the slurry to the die head, and the opening and closing of the coating valve generates an intermittent flow of the slurry. For example, as shown in Patent Document 3, the coating valve has a configuration in which the coating valve is closed when a valve plug abuts on a valve seat formed at an intermediate portion of a valve box and which is opened when the valve plug moves away from the valve seat. By adjusting the interval between the valve plug and the valve seat, it is possible to adjust the amount of the slurry that passes through the coating valve, and thereby, it is possible to change the amount of the slurry discharged from the die head. At the time when the coating valve is opened when the valve plug is moved from a position in the vicinity of the valve seat, in the direction to the discharge port of the die head, there is a possibility that some of the slurry will be pushed out by the moving valve plug and will be ejected from the discharge port so that the amount of applied slurry increases temporarily. In that case, as shown in FIG. 16a, on the produced electrode, in addition to thick-layer portion 2b where the thickness of active material layer 2 is large and thin-layer portion 2a where the thickness of active material layer 2 is small that is positioned at an edge portion of active material layer 2, protrusion portion 2x that is positioned at the border between thick-layer portion 2b and thin-layer portion 2a is formed due to the temporal increase in the application amount. Since unintended protrusion portion 2x is formed in this way, an electrode with desired characteristics cannot be obtained, and the thickness of the electrode partially increases. To prevent or reduce the generation of protrusion portion 2x and to accurately form thick-layer portion 2b and thin-layer portion 2a of active material layer 2, it is necessary to drive an actuator for opening and closing the coating valve based on a fairly complex profile, and to readjust the profile for each production lot of the slurry.

The valve disclosed in Patent Document 3 makes it possible to stabilize the supply amount at the start of the supply of the application liquid (slurry) in the intermittent application, that is, to stabilize the thickness at the start of the application. However, in order to form a step when starting to apply slurry to the electrode via the operation of the valve, it is necessary to instantaneously switch between opening movement of the valve and closing movement of the valve, and therefore, the formation of the step is likely to become unstable. Furthermore, when the layer thickness is changed by the change in the supply amount of the application liquid, with respect to a portion where small amount of slurry is discharged in order to decrease the layer thickness, there is a possibility that the application liquid cannot stably travel from the discharge port to a current collection foil. In that case, as shown in FIG. 16b, air is sometimes introduced in the flow of the application liquid so that air bubble 2y remains within active material layer 2 of the electrode, and as shown in FIG. 16c, the air bubble, as pinhole 2z, sometimes appears on the surface of the active material layer after drying. When air bubble 2y within the active material layer or pinhole 2z on the surface is present in this way, it is not possible to obtain the desired performance characteristics of the electrode.

An object of the present invention is to solve the above-described problems, and to provide a production method and production apparatus of an electrode for a secondary battery, an electrode for a secondary battery, and a secondary battery that make it possible to increase reliability by preventing or reducing the volume increase and deformation of the battery element when a short circuit between electrodes is prevented by an insulating member further enhance the performance of the battery.

Means to Solve the Problem

The present invention relates to a production method of an electrode for a secondary battery, the secondary battery including an electrode laminated assembly that has a configuration in which electrodes and a separator are laminated, and the electrode includes a current collector and an active material layer formed on a surface of the current collector. The active material layer includes a thick-layer portion and a thin-layer portion that is positioned at an edge portion of the active material layer and that is smaller in thickness than the thick-layer portion, and is formed by discharging slurry containing an active material from a discharge port of a die head toward the surface of the current collector, the slurry being supplied to the die head through a coating valve. At the time of forming the thin-layer portion of the active material layer, the slurry supplied through the coating valve with a smaller opening than at the time of the forming the thick-layer portion, is discharged toward the current collector from the discharge port that is closer to the current collector than at the time of the forming the thick-layer portion.

Further, the present invention relates to a production method of an electrode for a secondary battery, the secondary battery including an electrode laminated assembly that has a configuration in which electrodes and a separator are laminated, and the electrode includes a current collector and an active material layer formed on a surface of the current collector. The active material layer includes a thick-layer portion and a thin-layer portion that is positioned at an edge portion of the active material layer and that is smaller in thickness than the thick-layer portion, and is formed by discharging slurry containing an active material from a discharge port of a die head toward the surface of the current collector, the slurry being supplied to the die head through a coating valve. At the time of the formation of the thin-layer portion of the active material layer, a smaller amount of the slurry, than the amount applied when the thick-layer portion is formed, is discharged toward the current collector from the discharge port that is closer to the current collector than at the time of the formation of the thick-layer portion by changing the angle of the die head to the current collector.

The present invention relates to a production apparatus of an electrode for a secondary battery, the secondary battery including an electrode laminated assembly that has a configuration in which electrodes and a separator are laminated, and the apparatus includes: a die head that has a discharge port to discharge slurry containing an active material toward a surface of a current collector configuring the electrode; and a coating valve that supplies the slurry to the die head and that can adjust the amount of an opening. The die head can increase the interval between the discharge port and the current collector, when forming a thick-layer portion where the thickness of the active material layer is large on the surface of the current collector, and can decrease the interval between the discharge port and the current collector, when forming a thin-layer portion where the thickness is small on the surface of the current collector. The coating valve can increase the amount of an opening to increase an amount of the slurry that is supplied to the die head, when forming the thick-layer portion on the surface of the current collector, and can decrease the amount of an opening to decrease the amount of the slurry that is supplied to the die head, when forming the thin-layer portion on the surface of the current collector.

The present invention relates to a production apparatus of an electrode for a secondary battery, the secondary battery including an electrode laminated assembly that has a configuration in which electrodes and a separator are laminated, and the apparatus includes: a die head that has a discharge port to discharge slurry containing an active material toward a surface of a current collector that is a part of the electrode and that can be turned; and a coating valve that supplies the slurry to the die head. The die head, by being turned, can increase the interval between the discharge port and the current collector, when forming a thick-layer portion where a thickness of the active material layer is large on the surface of the current collector, and can decrease the interval between the discharge port and the current collector, when forming a thin-layer portion where the thickness is small on the surface of the current collector.

In the electrode for a secondary battery in the present invention, the electrode includes a current collector and an active material layer formed on a surface of the current collector and the active material layer includes a thick-layer portion and a thin-layer portion that is positioned at an edge portion of the active material layer and that is smaller in thickness than the thick-layer portion. An insulating member is provided so as to cover a border portion between a non-application portion where the active material layer is not formed on the current collector and the thin-layer portion of the active material layer. The sum of the thickness of the thin-layer portion and the thickness of the insulating member is smaller than a thickness of the thick-layer portion. The thin-layer portion has a length of 1.5 mm or more. A length of a transition portion between the thin-layer portion and the thick-layer portion is 1 mm or less.

A secondary battery in the present invention includes: an electrode laminated assembly that has a configuration in which electrodes and a separator are laminated; and an outer container that accommodates the electrode laminated assembly together with electrolyte, and at least some of the electrodes included in the electrode laminated assembly are the electrodes for a secondary battery that have the above configurations.

Advantageous Effects of Invention

According to the present invention, it is possible to increase reliability by preventing or reducing a volume increase and deformation of the battery element when a short circuit between the electrodes is prevented by an insulating member, and it is possible to further enhance the performance of the battery.

FIG. $6a_1$ is an outline view showing a formation step of a thin-layer portion of an active material layer in the production method of an electrode for a secondary battery in a second exemplary embodiment of the present invention, FIG. $6a_2$ is an enlarged view of a principal part of FIGS. $6a_1$, $6b_1$ is an outline view showing a formation step of a thick-layer portion, and FIG. $6b_2$ is an enlarged view of a principal part of FIG. $6b_1$.

Figure 7A:
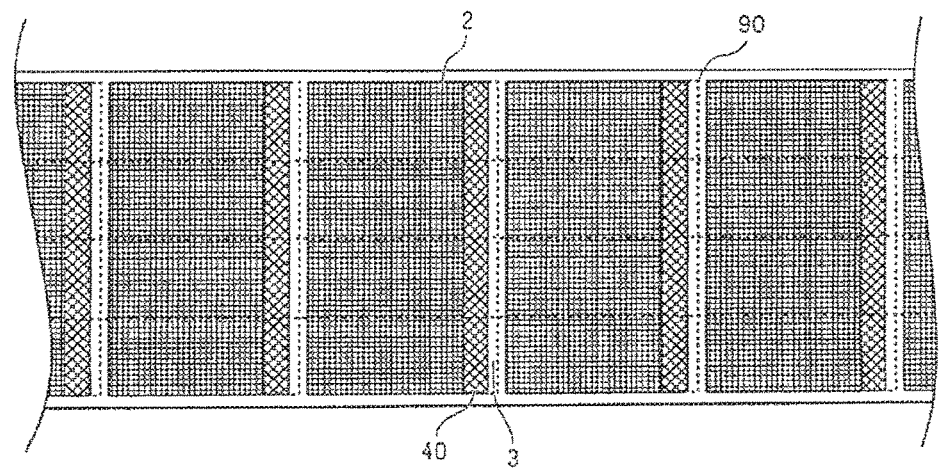
Figure 7B:
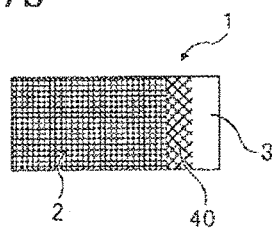

FIG. 7a is a plan view of an electrode produced by an example of the present invention before cutting a current collector, and FIG. 7b is a plan view after cutting the current collector.

Figure 8:
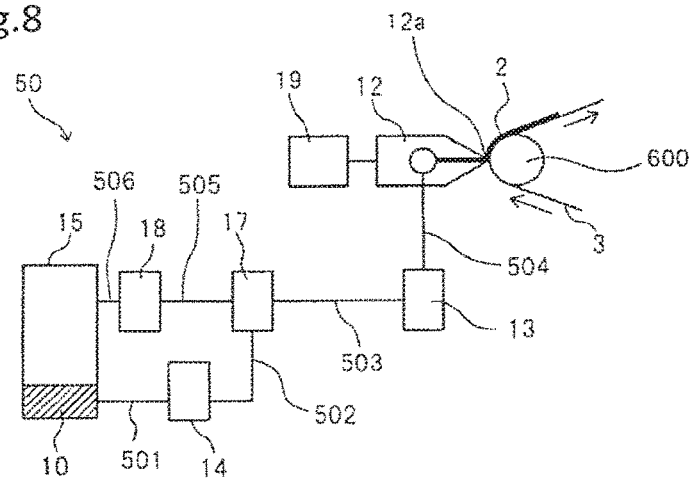

FIG. 8 is a schematic view showing a production apparatus of an electrode for a secondary battery in an example of the present invention.

Figure 9A:
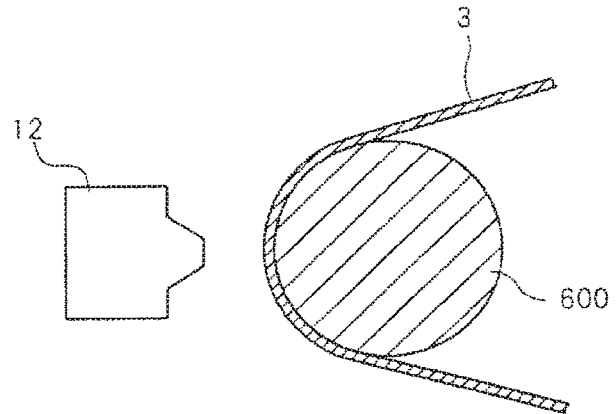
Figure 9B:
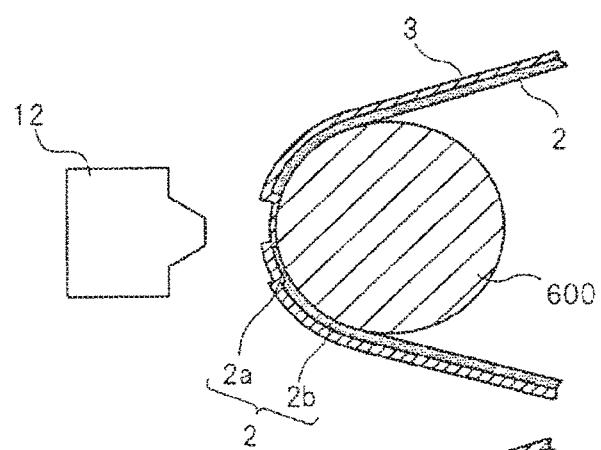
Figure 9C:
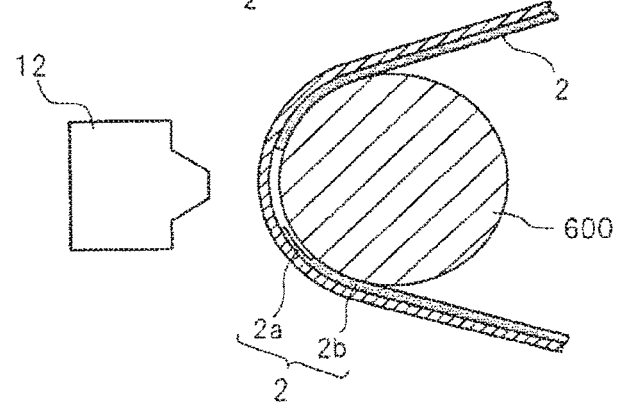

FIG. 9a is an outline view schematically showing a step of forming an active material layer on one surface of the current collector, FIG. 9b is an outline view schematically showing a step of forming an active material layer on the other surface of the current collector having the active material layer formed on the one surface, and FIG. 9c is an outline view schematically showing another example of the step of forming the active material layer on the other surface of the current collector having the active material layer formed on the one surface.

Figure 10A:
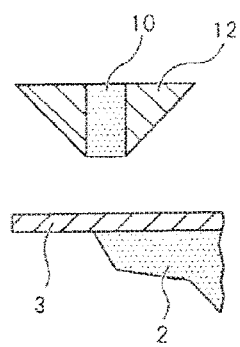
Figure 10B:
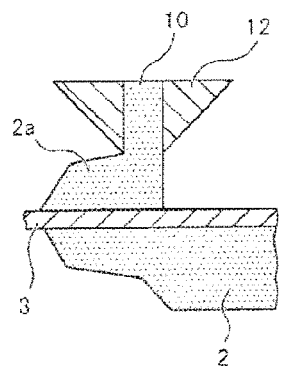
Figure 10C:
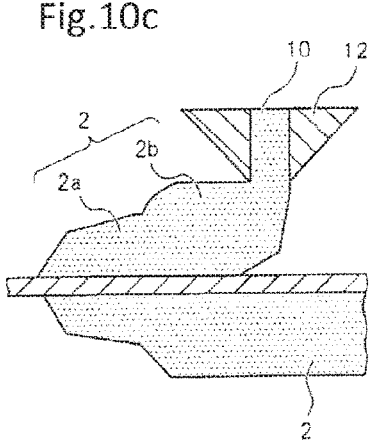

FIGS. 10a-10c are outline views schematically showing a formation step of the active material layer on the other surface when the current collector having the active material layer formed on the one surface moves in a state where a part of the current collector is not contact with a back roll.

Figure 11:
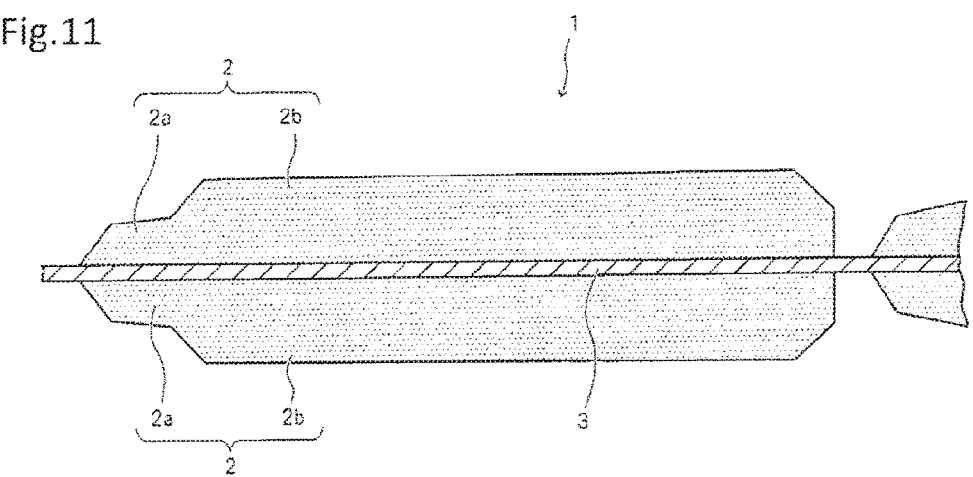

FIG. 11 is a lateral view showing an electrode in a completion state.

Figures 12A, 12B, 12C:
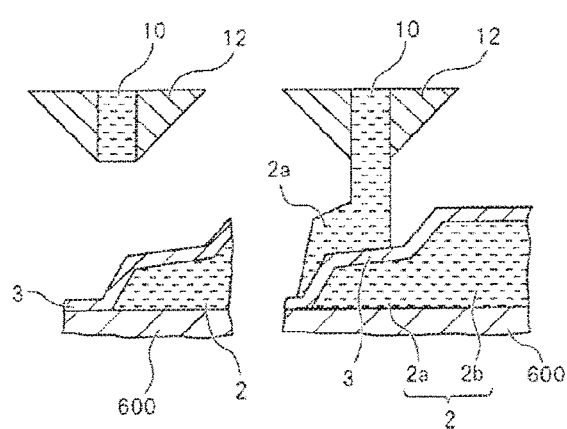

FIGS. 12a-12c are outline views schematically showing a formation step of the active material layer on the other surface when the current collector having the active material layer formed on the one surface moves in a state where the current collector is in contact with a back roll.

Figure 13A:
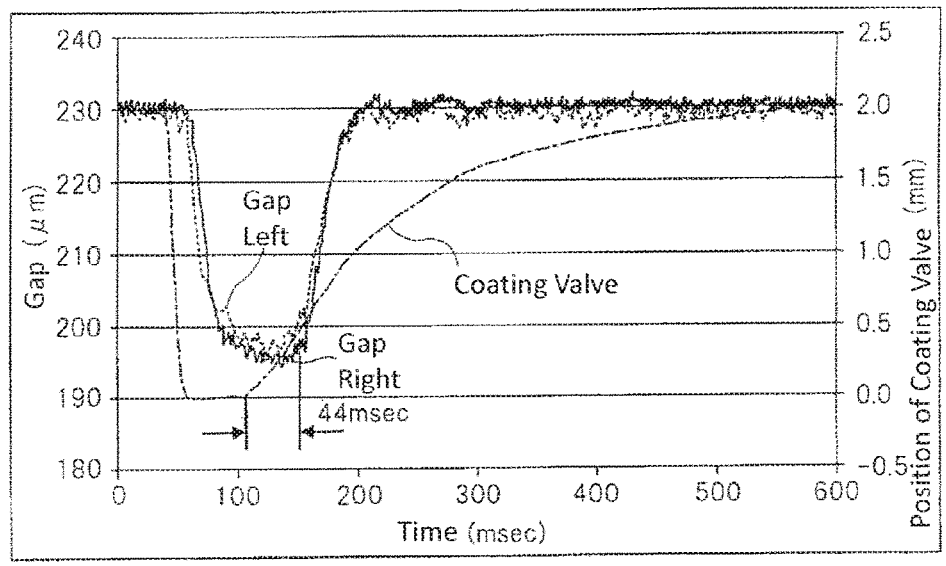
Figure 13B:
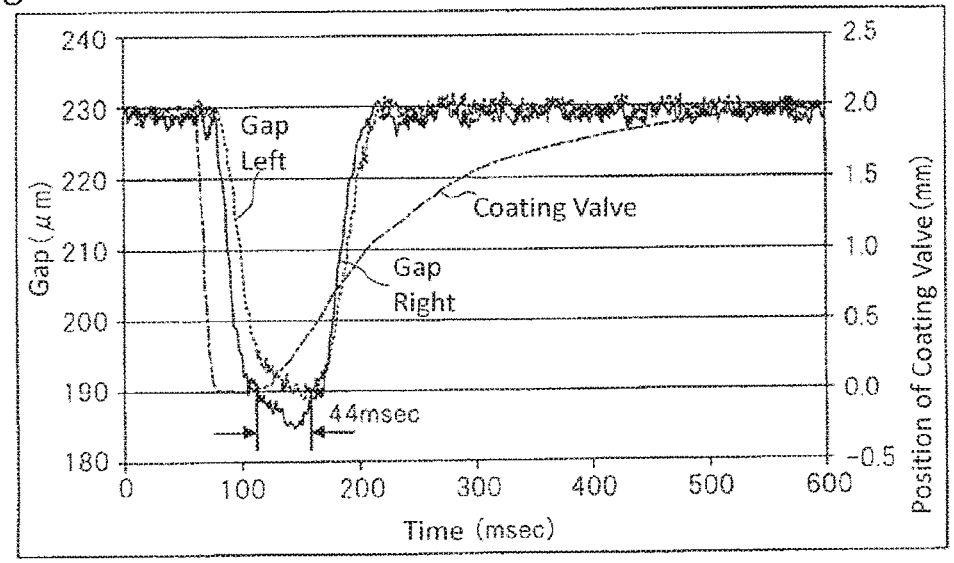

FIGS. 13a-13b are graphs showing the action of the coating valve and the action of a die head in the formation step of the active material layer.

Figure 14:
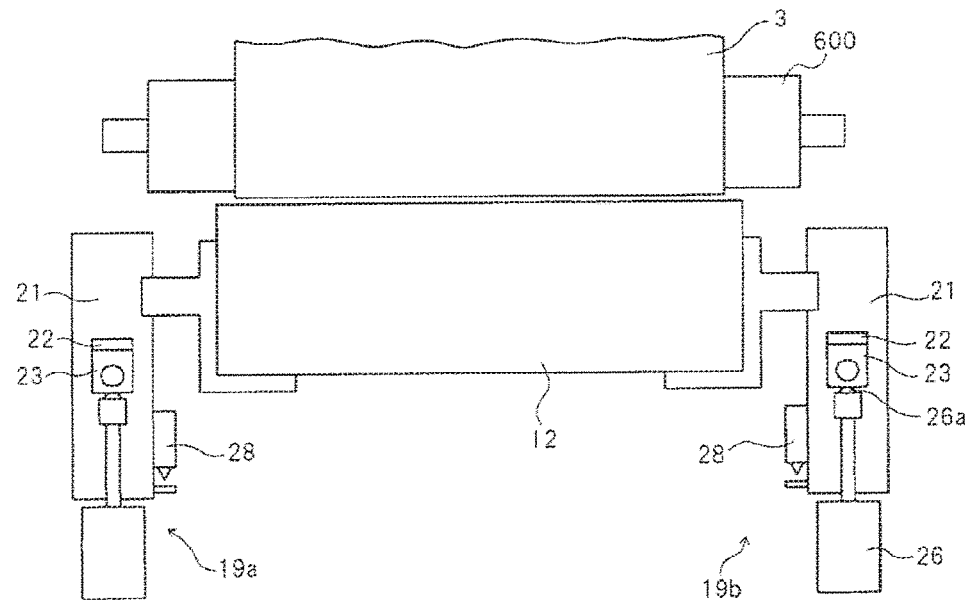

FIG. 14 is a plan view showing drive means for the die head.

Figure 15:
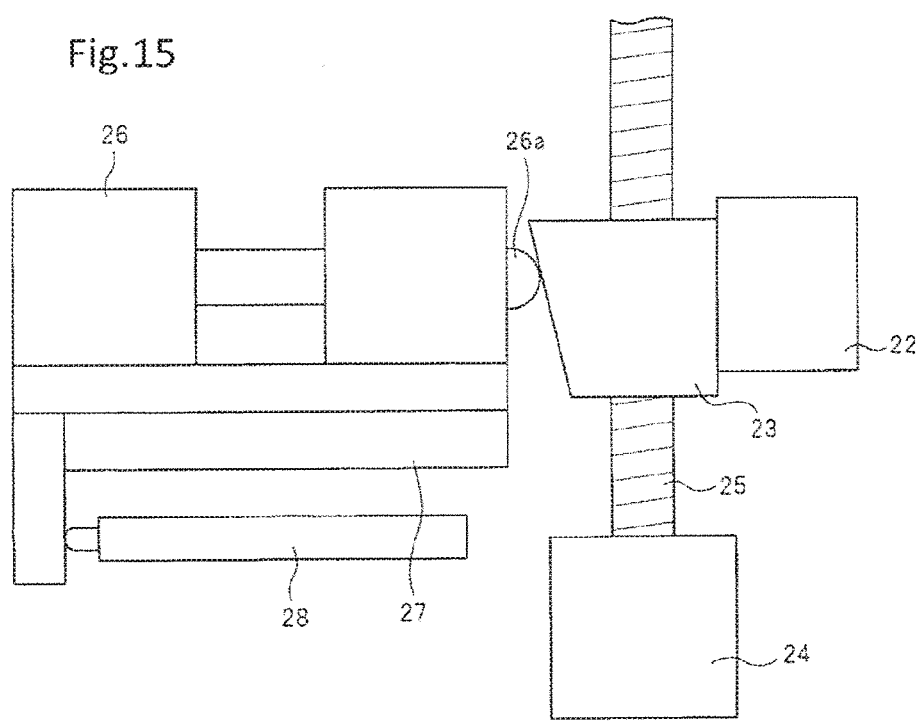

FIG. 15 is a lateral view of a principal part of the drive means shown in FIG. 14.

Figure 16A:
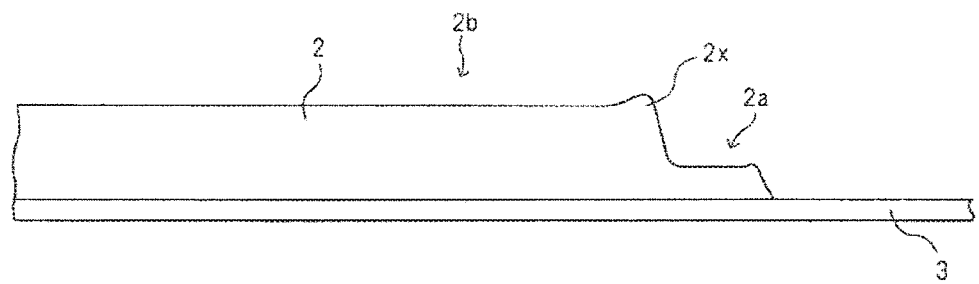
Figure 16B:
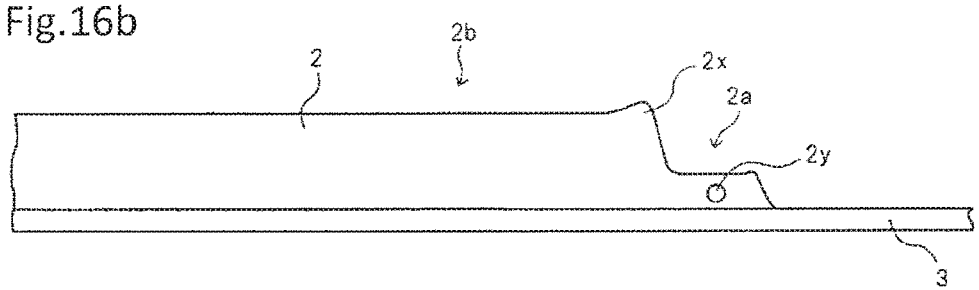
Figure 16C:
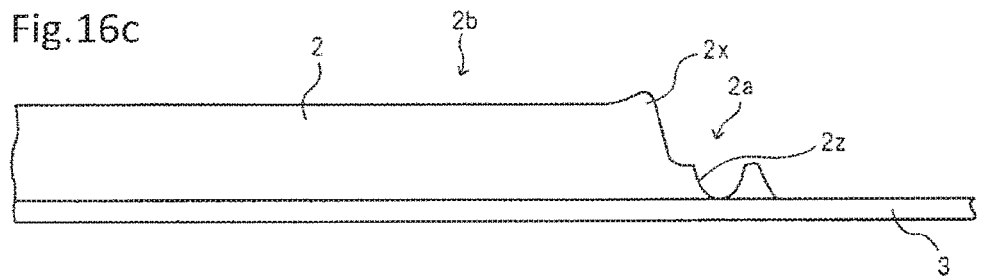

FIGS. 16a-16c are enlarged lateral views showing a principal part of an electrode for a secondary battery that is produced according to the related art.

DESCRIPTION OF EXEMPLARY EMBODIMENTS

Hereinafter, exemplary embodiments of the present invention will be described with use of the drawings.

[Basic Structure of Secondary Battery]

Figure 1:
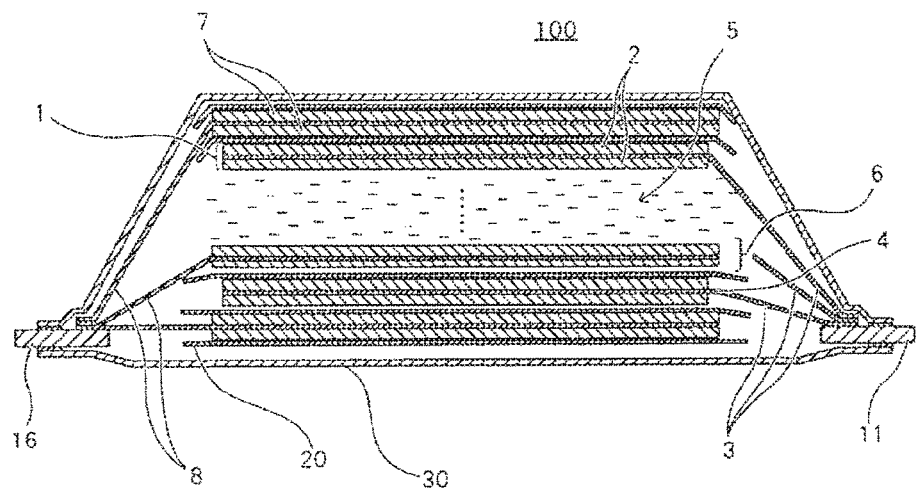
FIG. 1 is a cross-section view showing the basic structure of a laminated-type secondary battery in the present invention.

FIG. 1 schematically shows an example of the configuration of a laminated-type lithium ion secondary battery for which the present invention is employed. Lithium ion secondary battery 100 in the present invention includes an electrode laminated assembly (battery element) in which a pair of electrodes, that is, positive electrodes (positive electrode sheets) 1 and negative electrodes (negative electrode sheets) 6 are alternately laminated with separators 20 interposed therebetween. The electrode laminated assembly is accommodated in an outer container made of flexible film 30, together with electrolyte 5. One end of positive electrode terminal 11 is connected with positive electrode 1 of the electrode laminated assembly, and one end of the negative electrode terminal 16 is connected with negative electrode 6. The other end of positive electrode terminal 11 and the other end of negative electrode terminal 16 each are led out of flexible film 30. In FIG. 1, the illustration of a part of the layers configuring the electrode laminated assembly (layers positioned at an intermediate portion in the thickness direction) is omitted, and electrolyte 5 is illustrated.

Figure 2:
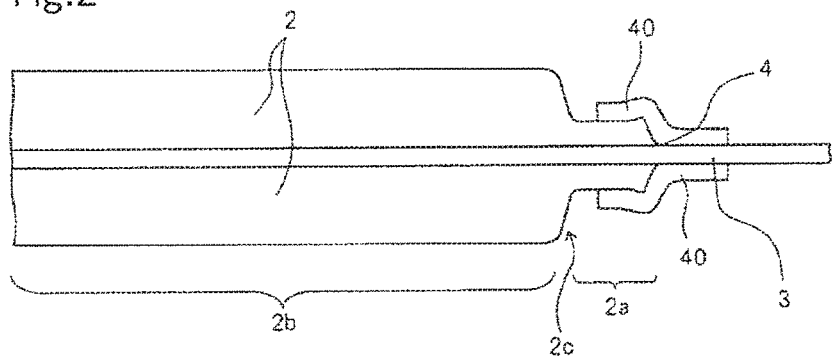
FIG. 2 is an enlarged lateral view showing a principal part of a positive electrode of the secondary battery shown in FIG. 1.

Electrodes 1, 6 include current collectors 3, 8 and active material layers 2, 7 formed on current collectors 3, 8, respectively. That is, positive electrode 1 includes positive electrode current collector 3 and positive electrode active material layer 2 formed on positive electrode current collector 3, and on the front surface and back surface of positive electrode current collector 3, an application portion where positive electrode active material layer 2 is formed and a non-application portion where positive electrode active material layer 2 is not formed are positioned so as to be arrayed along the longitudinal direction. As shown in FIG. 2, positive electrode active material layer 2 includes thick-layer portion 2b that is the major portion and where the thickness is large, and thin-layer portion 2a that is provided at an edge portion of a border portion with the non-application portion and where the thickness is small. Transition portion 2c between thick-layer portion 2b and thin-layer portion 2a may be a step portion that is nearly vertical as shown in FIG. 2, or may be an incline portion that is somewhat gentle, which is not illustrated. It is preferable that transition portion 2c be as small as possible, for example, the length be 1 mm or less. Depending on circumstances, the length of transition portion 2c may be 0 mm, that is, positive electrode active material layer 2 may be configured so that transition portion 2c is substantially absent. Further, an outer edge portion of thin-layer portion 2a may be slightly inclined, or may be substantially vertical with respect to positive electrode current collector 3.

As shown in FIG. 1, negative electrode 6 includes negative electrode current collector 8 and negative electrode active material layer 7 formed on negative electrode current collector 8, and on the front surface and back surface of negative electrode current collector 8, the application portion and the non-application portion are positioned so as to be arrayed along the longitudinal direction. The application portion (negative electrode active material 8) of negative electrode 6 is configured by the thick-layer portion, and the thin-layer portion is not present. An edge portion of the application portion (negative electrode active material layer 8) may be slightly inclined, or may be substantially vertical with respect to negative electrode current collector 7.

In the following description, an exemplary configuration in which only positive electrode 1 includes thin-layer portion 2a and thick-layer portion 2b and in which insulating member 40 is attached to only positive electrode 1 will be described. However, a configuration in which both positive electrode 1 and negative electrode 6 include the thin-layer portion and the thick-layer portion and in which insulating members 40 are attached to both electrodes may be adopted, and further, a configuration in which only negative electrode 6 includes the thin-layer portion and the thick-layer portion and in which insulating member 40 is attached to only negative electrode may be adopted.

Each non-application portion of positive electrodes 1 and negative electrodes 6 is used as a tab for the connection with the electrode terminal (positive electrode terminal 11 or negative electrode terminal 16). Positive electrode tabs connected with positive electrodes 1 are collected on positive electrode terminal 11, and are connected with each other by ultrasonic welding or the like, together with positive electrode terminal 11. Negative electrode tabs connected with negative electrodes 6 are collected on negative electrode terminal 16, and are connected with each other by ultrasonic welding or the like, together with negative electrode terminal 16. Then, the other end of positive electrode terminal 11 and the other end of negative electrode terminal 16 each are led out of the outer container.

Insulating member 40 for preventing the short circuit with negative electrode terminal 16 is formed so as to cover border portion 4 between the application portion and non-application portion of positive electrode 1. Insulating member 40 is formed so as to cover border portion 4 across both the positive electrode tab (non-application portion) and thin-layer portion 2a of positive electrode active material 2 (application portion). To stably hold the insulating member, it is preferable that the length of thin-layer portion 2a be 1.5 mm or more.

The external dimensions of the application portion (negative electrode active material layer 7) of negative electrode 6 are larger than the external dimensions of the application portion (positive electrode active material layer 2) of positive electrode 1, and are smaller than the external dimensions of separator 20.

In the secondary battery, examples of the material composing positive electrode active material layer 2 include layered oxide materials such as $LiCoO_2$, $LiNiO_2$, $LiNi_{(1-x)}CoO_2$, $LiNi_x(CoAl)_{(1-x)}O_2$, $Li_2MnO_3\text{-}LiMO_2$ (here, M is a transition metal, and examples thereof include Ni, Co, Fe, Cr) and $LiNi_{1/3}Co_{1/3}Mn_{1/3}O_2$, spinel materials such as $LiMn_2O_4$, $LiMn_{1.5}Ni_{0.5}O_4$ and $LiMn_{(2-x)}M_xO_4$, olivine materials such as $LiMPO_4$, olivine fluoride materials such as $Li_2MPO_4F$ and $Li_2MSiO_4F$, and vanadium oxide materials such as $V_2O_5$, and mixtures of one kind or two or more kinds of these materials can be used.

Examples of the material composing negative electrode active material layer 7 include carbon materials such as graphite, amorphous carbon, diamond-like carbon, fulleren, carbon nanotubes and carbon nanohorns, lithium metal materials, alloy materials of silicon, tin or the like, oxide materials such as $Nb_2O_5$ and $TiO_2$, or compounds of these materials can be used.

The material composing positive electrode active material layer 2 and negative electrode active material layer 7 may be a mixture agent in which a binding agent, a conductive auxiliary agent or the like is added when appropriate. As the conductive auxiliary agent, combinations of one kind or two or more kinds of carbon black, carbon fiber, graphite and the like can be used. Further, as the binding agent, polyvinylidene fluoride (PVDF), polytetrafluoroethylene, carboxymethyl cellulose, modified acrylonitrile rubber particles or the like can be used.

As positive electrode current collector 3, aluminum, stainless steel, nickel, titanium, alloys of these materials, or the like can be used, and particularly, aluminum is preferable. As negative electrode current collector 8, copper, stainless steel, nickel, titanium, or alloys of these materials can be used.

As electrolyte 5, mixtures of one kind or two or more kinds of organic solvents including cyclic carbonates such as ethylene carbonate, propylene carbonate, vinylene carbonate and butylene carbonate, chain carbonates such as ethyl methyl carbonate (EMC), diethyl carbonate (DEC), dimethyl carbonate (DMC) and dipropyl carbonate (DPC), aliphatic carboxylate esters, γ-lactones such as γ-butyrolactone, chain ethers, and cyclic ethers can be used. Furthermore, in the organic solvents, lithium salt may be dissolved.

Separator 20 is mainly composed of a porous membrane, a woven fabric, an unwoven fabric or the like that is made of a resin. As the resin component, for example, polyolefin resins such as polypropylene and polyethylene, polyester resins, acrylic resins, styrene resins, nylon resins, and the like can be used. Particularly, polyolefin microporous membranes are preferable because of having excellent ion permeability and characteristics that enable physically separating the positive electrode and the negative electrode. Further, as necessary, a layer containing inorganic particles may be formed on separator 20. Examples of the inorganic particles include insulating oxides, nitrides, sulfides, carbides and others, and in particular, it is preferable that the layer contain $TiO_2$ or $Al_2O_3$.

As the outer container, a case formed of flexible film 30, a can case and the like can be used, and from the standpoint of reducing battery weight, it is preferable to use flexible film 30. As flexible film 30, a film in which resin layers are provided on the front surface and back surface of a metal layer which is a base can be used. As the metal layer, a metal layer having a barrier property for preventing the leakage of electrolyte 5 and for the intrusion of moisture from the outside can be selected, and aluminum, stainless steel and the like can be used (particularly, aluminum is preferable). On at least one surface of the metal layer, a heat-adhesive resin layer of modified polyolefin or the like is provided. The heat-adhesive resin layers of flexible films 30 are provided so as to face each other, and the periphery of a portion where the electrode laminated assembly is accommodated is heat-sealed, so that the outer container is formed. Resin layers composed of a nylon film, a polyester film or the like may be provided on the outer container surface opposite to the surface on which the heat-adhesive resin layer is formed.

For positive electrode terminal 11, materials composed of aluminum or aluminum alloys can be used, and for negative electrode terminal 16, copper, copper alloys, nickel-plated copper or nickel-plated copper alloy, or the like can be used. The other end side of each of terminals 11, 16 is led out of the outer container. In each of terminals 11, 16, a heat-adhesive resin may be previously provided in a portion corresponding to the heat-welded portion of the outer periphery portion of the outer container.

For insulating member 40 formed so as to cover border portion 4 between the application portion and non-application portion of positive electrode active material 2, polyimide, glass fiber, polyester, polypropylene, or materials that contain them can be used. Insulating member 40 can be formed by welding a tape-like resin member on border portion 4 on heating, or by applying a gel-like resin on border portion 4 and then drying it.

[Detailed Structure and Production Method of Positive Electrode]

FIG. 2 is an outline cross-section view for describing an exemplary embodiment of the lithium ion secondary battery in the present invention, and schematically describes a part of the electrode laminated assembly in an enlarged manner.

Although the illustration is omitted in FIG. 1, positive electrode active material layer 2 in the exemplary embodiment, as shown in FIG. 2, includes thick-layer portion 2b that is positioned near the central portion and that has a roughly even thickness equivalent to the average film thickness of positive electrode active material layer 2, and thin-layer portion 2a that is positioned at one edge of positive electrode active material layer 2 and that is smaller in thickness than thick-layer portion 2b. Thin-layer portion 2a is a portion where applying the slurry that contains the positive electrode active material on positive electrode current collector 3 is started. The thicknesses of thin-layer portion 2a and thick-layer portion 2b are set such that the sum of the thickness of thin-layer portion 2a and the thickness of insulating member 40, in which a part is disposed on thin-layer portion 2a, is equal to or less than the average thickness of thick-layer portion 2a.

Figure 3:
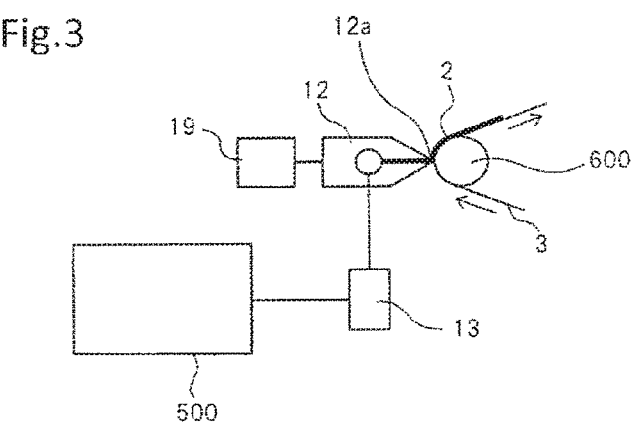
FIG. 3 is a schematic view showing a production apparatus of an electrode for the secondary battery in the present invention.

Next, a production apparatus for applying the slurry that contains the positive electrode active material on positive electrode current collector 3 will be described. As schematically shown in FIG. 3, the production apparatus includes back roll 600 that configures conveyance means for conveying positive electrode current collector 3, die head 12 that has discharge port 12a to discharge the slurry toward positive electrode current collector 3 held on back roll 600, supplier 500 that supplies the slurry, and coating valve 13 that is positioned between die head 12 and supplier 500. By drive means 19, die head 12 can be moved in the direction of moving close to or moving away from back roll 600 (the right-left direction in FIG. 3).

Figure 4:
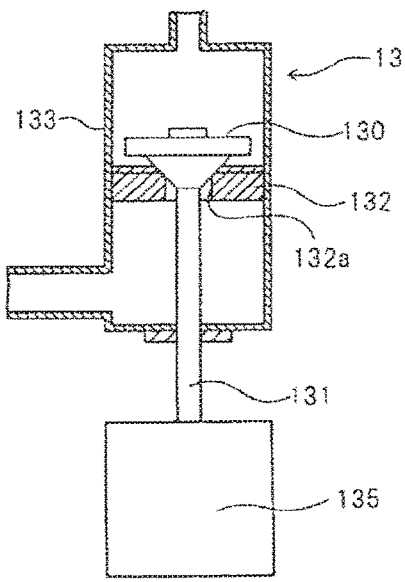
FIG. 4 is an enlarged cross-section view showing a coating valve of the production apparatus shown in FIG. 3.

As shown in FIG. 4, in coating valve 13, valve seat 132 that has through-hole 132a is provided at the central portion within valve box 133, and valve plug 130 that can make contact with and can move away from valve seat 132 is disposed. Shaft 131 is formed integrally with valve plug 130, and motor 135 is connected to shaft 131. When motor 135 is actuated, valve plug 130, through shaft 131, is moved in the direction of becoming close to or avoiding away from valve seat 132 (the up-down direction in FIG. 4). In a state where valve plug 130 abuts on valve seat 132, through-hole 132a is blocked by valve plug 130, and coating valve 13 is in the closed state. When valve plug 130 is away from valve seat 132, through-hole 132a is unblocked, and coating valve 13 is in the opened state. Then, depending on the distance from valve seat 132 to valve plug 130, the opening degree (opening amount) of coating valve 13 changes, and the amount of the slurry that is to pass through coating valve 13 varies.

Because of such a configuration, the slurry supplied from supplier 500 is either blocked from flowing by coating valve 13 or supplied to die head 12 after flow rate adjustment in coating valve 13, to be discharged from die head 12 and adheres to positive electrode current collector 3, and then, by drying and solidifying, positive electrode active material layer 2 is formed. In the production method of positive electrode 1 by intermittent application, for the portion (non-application portion) where the positive electrode active material layer is not formed on current collector 3, coating valve 13 is closed, that is, valve plug 130 is moved and is made to abut on valve seat 132 by motor 135, and in a state where the slurry is not supplied to die head 12 and the slurry is not discharged, positive electrode current collector 3 is transported by back roll 600. Thereby, the non-application portion is formed. Then, discharge of the slurry is started while positive electrode current collector 3 continuously moves, and thereby, thin-layer portion 2a, which is one edge portion of positive electrode active material layer 2, is formed. Specifically, while die head 12 is kept at a position in the vicinity of positive electrode current collector 3 on back roll 600, valve plug 130 is slightly moved by motor 135 so as to be a short distance away from valve seat 132, and a small amount of the slurry is supplied to die head 12. Then, a small amount of the slurry is discharged from die head 12 to positive electrode current collector 3 on back roll 600, and thin-layer portion 2a where the thickness is small is formed.

Subsequently, for forming thick-layer portion 2b where the thickness is large, die head 12 moves away from positive electrode current collector 3 on back roll 600 by drive means 19 while valve plug 130 is moved by motor 135 so as to be a longer distance from valve seat 132, and a large amount of the slurry is supplied to die head 12. The large amount of the slurry is discharged from die head 12 to positive electrode current collector 3 on back roll 600, and thick-layer portion 2b where the thickness is large is formed. After the formation of thick-layer portion 2b is completed, valve plug 130 is moved by motor 135 so as to abut on valve seat 132, so that the slurry is not supplied to die head 12 and the slurry is not discharged. By repeating these actions, the slurry is intermittently discharged to positive electrode current collector 3, and positive electrode active material layers 2 are formed. After positive electrode active material layer 2 is dried and solidified, positive electrode current collector 3 is cut, so that positive electrodes 1 are obtained. Incidentally, by moving valve plug 130 close to valve seat 132 just before the formation of thick-layer portion 2b is finished, it is possible to decrease the amount of the slurry that is supplied to die head 12.

According to this method, at the time of the formation of thick-layer portion 2b, the interval between positive electrode current collector 3 on back roll 600 and discharge port 12a of die head 12 is set to the same length as that in a general coating step, and the degree to which coating valve 13 is open is increased, so that a sufficient amount of the slurry is supplied to die head 12. Thereby, it is possible to stably form thick-layer portion 2b. On the other hand, at the time of forming thin-layer portion 2a, the interval between positive electrode current collector 3 on back roll 600 and discharge port 12a of die head 12 is set to a shorter length than that in the related art, and the degree to which coating valve 13 is open is decreased, so that a small amount of slurry is supplied to die head 12. Thereby, the amount of slurry that is discharged from die head 12 to positive electrode current collector 3 is decreased. On this occasion, since the interval between positive electrode current collector 3 and discharge port 12a is short, the discharged slurry stably travels toward the current collector, even at the time when a small amount of slurry is discharged, and it is possible to stably form thin-layer portion 2a, while hardly any air is introduced. Accordingly, hardly any air bubble within positive electrode active material layer 2 or the pinhole on the surface is hardly generated, and good thin-layer portion 2a is formed. Further, in the transitional time from the formation of thin-layer portion 2a to the formation of thick-layer portion 2b (in the formation of transition portion 2C), the amount of the slurry that passes through coating valve 13 increases, but, by moving valve plug 130 with the motor, it is possible to move valve plug 130 smoothly and immediately. Furthermore, with the increase in the supply amount of the slurry, die head 12 is removed from positive electrode current collector 3. As a result, it is possible to prevent or reduce the formation of an unintended protrusion at transition portion 2c from thin-layer portion 2a to thick-layer portion 2b and the periphery.

As described above, according to the exemplary embodiment, in addition to the basic action in which the slurry discharge from die head 12 is started when the application of positive electrode active material layer 2 is started and the slurry discharge from die head 12 is finished, when the formation of positive electrode active material layer 2 is finished, the slurry discharge amount for thin-layer portion 2a that is a portion where the formation of positive electrode active material layer 2 is started and the slurry discharge amount for an end edge portion where the formation of positive electrode active material layer 2 is finished are decreased, and thereby, it is possible to accurately form the step portion or incline portion of each edge portion such that the length is as short as possible (for example, 1 mm or less). Furthermore, to prevent or reduce the generation of the pinhole due to introduction of air, it is further preferable to form thin-layer portion 2a while changing the interval between discharge port 12a of die head 12 and positive electrode current collector 3.

It is particularly preferable that the movement of valve plug 130 of coating valve 13 be performed by motor 135. This is because the use of motor 135 makes it possible to perform the liner motion of shaft 131 that is connected integrally with valve plug 130 by an arbitrary action profile, and makes it possible to arbitrarily control the amount of opening between valve plug 130 and through-hole 132a of valve seat 132 at a high speed compared to the use of an air cylinder or the like.

The method for changing the interval between discharge port 12a of die head 12 and positive electrode current collector 3 is not particularly limited, and may be any method if the method allows for a change in the positional relation between discharge port 12a and the slurry application position on positive electrode current collector 3. As an example, die head 12 may be disposed such that die head 12 can be moved by drive means 19 in the vertical direction and the horizontal direction with respect to positive electrode current collector 3 at the position at which the slurry is applied. Specifically, die head 12, to prevent the introduction of air, is at a first position close to positive electrode current collector 3 at the start of the application, to form thin-layer portion 2a, and then, moves to a second position where the interval from positive electrode current collector 3 is larger than the first position. The opening amount (opening degree) of coating valve 13 is small when die head 12 is at the first position, and is large when die head 12 is at the second position. Incidentally, for the non-application portion where positive electrode active material layer 2 is not applied, the interval between the discharge port 12a and positive electrode current collector 3 may be further increased, or die head 12 may be moved to a position at still a different interval, other than the first position and the second position.

Thus, by controlling both the discharge amount of the slurry and the interval from positive electrode current collector 3 to discharge port 12a of die head 12, it is possible to accurately form the application edge of positive electrode 1 when the slurry is intermittently applied.

Figure 5:
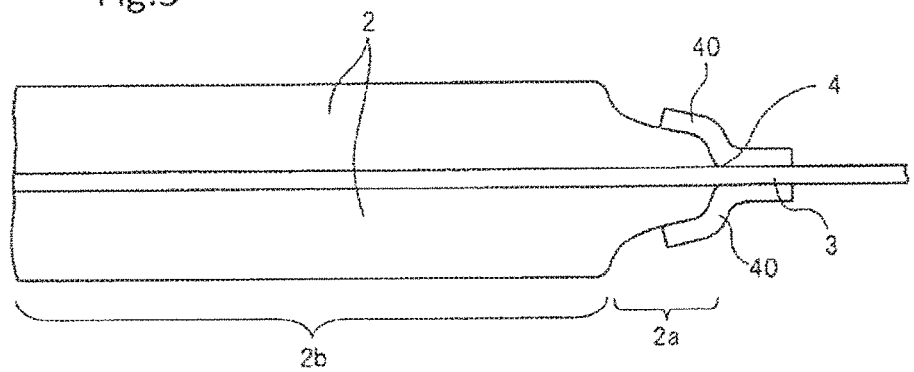
FIG. 5 is an enlarged lateral view showing a principal part of a modification of the positive electrode of the secondary battery shown in FIG. 1.

FIG. 5 shows positive electrode 1 produced by a modification of the exemplary embodiment. Thin-layer portion 2a of positive electrode active material layer 2 does not have an almost uniform thickness as in the case of the example shown in FIG. 2, and has an incline form in which the thickness gradually increases from the edge portion toward the central portion. In this case, depending on the change in the thickness of thin-layer portion 2a, the interval between discharge port 12a of die head 12 and positive electrode current collector 3 and the interval between valve plug 130 and valve seat 132 each may be continuously changed. In the modification, thin-layer portion 2a and transition portion 2c is clearly not separated, and transition portion 2c can be regarded as not being present.

Next, a second exemplary embodiment of the present invention will be described.

In the exemplary embodiment, as shown in FIGS. 6a₁-6b₂, die head 12 is disposed so as to be able to be turned, and the angle between the direction (arrow A) of discharging the slurry from discharge port 12a of die head 12 and tangent line B of back roll 600 changes. In the configuration, instead of parallel movement in which die head 12 moves close to or moves away from back roll 600 as in the case of the first exemplary embodiment, the turn of die head 12 changes the interval between discharge port 12a of die head 12 and positive electrode current collector 3 on back roll 600. Specifically, as shown in FIGS. 6$a_1$ and 6$a_2$, in the case where the discharge direction A of the slurry from discharge port 12a is orthogonal to tangent line B of back roll 600 and is linearly oriented to the center of back roll 600, interval C1 between discharge port 12a and positive electrode current collector 3 is small. Accordingly, when thin-layer portion 2a of positive electrode active material layer 2 is formed, die head 12 is kept at such a position and attitude.

By contrast, as shown in FIGS. 6$b_1$ and 6$b_2$, in the case where, by the turn of die head 12, the discharge direction A of the slurry from discharge port 12a of die head 12 is obliquely inclined with respect to above-described tangent line B and is not linearly oriented to the center of back roll 600, interval C2 between discharge port 12a and positive electrode current collector 3 is large. Accordingly, when thick-layer portion 2b of positive electrode active material layer 2 is formed, die head 12 is kept at such a position and attitude.

In the case of the configuration of changing the interval from positive electrode current collector 3 by the turn of the whole of die head 12 instead of parallel movement, in this way, the configuration is simple. Incidentally, die head 12 merely has to be turned by about 2 to 10 degrees, for the change from the state where the interval between die head 12 and positive electrode current collector 3 is small as shown in FIGS. 6$a_1$ and 6$a_2$ to the state where the interval between die head 12 and positive electrode current collector 3 is large as shown in FIGS. 6$b_1$ and 6$b_2$.

Also in the exemplary embodiment, it is preferable to decrease the interval between discharge port 12a of die head 12 and positive electrode current collector 3 and decrease the discharge amount of the slurry, when thin-layer portion 2a is formed, and to increase the interval between discharge port 12a and positive electrode current collector 3 and increase the discharge amount of the slurry, when thick-layer portion 2b is formed. When the discharge amount of the slurry is changed, valve plug 130 of coating valve 13 may be moved as shown in FIG. 4, but valve plug 130 does not always need to be moved.

In the above-described first and second exemplary embodiments, at the time of the formation of thin-layer portion 2a of positive electrode active material layer 2 formed on positive electrode current collector 3, the interval between discharge port 12a of die head 12 and positive electrode current collector 3 is decreased. On this occasion, when the discharge pressure of the slurry is higher than a value corresponding to the shortened interval between discharge port 12a and positive electrode current collector 3, it is possible to densely apply the slurry such that air bubble 2y or pinhole 2z shown in FIGS. 16b and 16c are not generated. Accordingly, the effect of preventing the generation of protrusion portion 2x and the effect of preventing the generation of air bubble 2y or pinhole 2z are obtained by adequately setting the discharge pressure of the slurry. Such an adjustment of the discharge pressure of the slurry can be performed by using coating valve 13, as an example. However, by not changing the discharge pressure of the slurry and keeping it constant when decreasing the interval between discharge port 12a of die head 12 and positive electrode current collector 3, it is possible to make a state where the discharge pressure is high with respect to the interval between discharge port 12a and positive electrode current collector 3, as a result, and to prevent or reduce the generation of air bubble 2y or pinhole 2z shown in FIGS. 16b and 16c.

Thus, the example in which the present invention is applied to positive electrode 1 has been described, but the present invention can be also applied to negative electrode 6, with the same method and production apparatus. Further, the present invention can be also applied to both positive electrode 1 and negative electrode 6.

Further, the present invention is not limited to the application of the active material layer by the intermittent application technique, and can also be applied to the formation of the active material layer by a continuous application technique if the electrode active material layer includes the thick-layer portion and the thin-layer portion.

The present invention is particularly effective in the production of the electrode of a lithium ion secondary battery, but can also be applied to the production of electrodes of other secondary batteries.

EXAMPLES

Hereinafter, specific examples of the present invention will be described.

Example 1

[Production of Positive Electrode]

FIGS. 7a-7b shows a state where positive electrode active material layer 2 is formed on positive electrode current collector 3 according to the production method of the lithium ion secondary battery of the present invention in which technique for intermittently applying slurry is used. A part of the non-application portion of positive electrode 1 is a positive electrode tab, and insulating tape 40 is attached so as to cover border 4 between the application portion and the non-application portion.

A mixture of $LiMn_2O_4$ and $LiNi_{0.8}Co_{0.1}Al_{0.1}O_2$ was used as the positive electrode active material, carbon black was used as a conductive agent, and PVdF was used as a binder. Slurry in which a mixture of these materials was dispersed in an organic solvent was prepared. As shown in FIG. 7a, the slurry was intermittently applied on current collector 3 mainly composed of aluminum having a thickness of 20 µm, and was dried, so that positive electrode active material layers 2 having an average thickness of 80 µm were formed. The edge portion of positive electrode active material layer, that is, thin-layer portion 2a that was an application start portion was smaller in thickness than the other portion (thick-layer portion 2b). The specific application method will be described later.

Positive electrode active material layers 2 applied on positive electrode current collector 3 in this way were compressed in the thickness direction after positive electrode current collector 3 on which positive electrode active material layers 2 is formed is set in a press machine. Thereafter, insulating tapes 40 made of polypropylene and having a thickness of 30 µm are attached to a portion covering borders 4 between the application portions and non-application portions of positive electrode active material layers 2 that are formed at a predetermined interval in the longitudinal direction of positive electrode current collector 3. An edge portion of insulating tape 40 is disposed on the non-application portion where positive electrode active material layer 2 is not present, that is, is disposed directly on positive electrode current collector 3, and the other edge portion is disposed on thin-layer portion 2a where positive electrode active material layer 2 is thin.

<Formation of Positive Electrode Active Material Layer>

A method for applying the slurry containing the positive electrode active material by the intermittent application technique will be described with reference to FIG. 8.

As shown in FIG. 8, while positive electrode current collector 3 is conveyed in the arrow direction by a conveyance apparatus including back roll 600, the slurry is discharged to positive electrode current collector 3 from discharge port 12a of die head 12 that faces back roll 600. Thereby, positive electrode active material layer 2 is formed on the surface of positive electrode current collector 3. The production apparatus includes the same die head 12, coating valve 13 and supplier 50 as those of the apparatus shown in FIG. 3. Supplier 50 includes slurry tank 15, three-way valve 17 that is connected to coating valve 13, pump 14 that is positioned between slurry tank 15 and three-way valve 17, and return valve 18 that is positioned between slurry tank 15 and three-way valve 17 and that is positioned in a different path from pump 14. Accordingly, slurry 10 accumulated in slurry tank 15, by pump 14, is supplied to coating valve 13 through pipe 501, pipe 502, three-way valve 17 and pipe 503. When coating valve 13 is opened, the slurry is supplied to die head 12 through pipe 504, and is discharged from discharge port 12a toward positive electrode current collector 3. When coating valve 13 is closed, the slurry is not supplied to die head 12, and the slurry is not discharged. On the other hand, when the slurry is not discharged, three-way valve 17 switches the path through which the slurry passes, from pipe 503 to pipe 505. Accordingly, the slurry returns from pump 14 to slurry tank 15 through three-way valve 17, pipe 505, return valve 18 and pipe 506.

In the production of positive electrode 1, when positive electrode current collector 3 moves and is shifted from a position for forming the non-application portion to a position for forming the application portion, that is, when the slurry is intermittently applied to form the positive electrode active material layer, valve plug 130 is made to be slightly away from valve seat 132, and a small amount of the slurry is supplied to die head 12 through pipe 504 and is discharged from discharge port 12a to positive electrode current collector 3, so that thin-layer portion 2a is formed. On this occasion, die head 12 is at the first position where discharge port 12a is close to positive electrode current collector 3, and therefore, it is possible to prevent the introduction of air.

Subsequently, in the transition from the formation of thin-layer portion 2a to the formation of thick-layer portion 2b, valve plug 130 is moved by motor 135 shown in FIG. 4, so as to be further away from valve seat 132, and the amount to which coating valve 13 is opened is increased. On this occasion, since the slurry is instantaneously pushed into pipe 504 by the movement of valve plug 130, the amount of the slurry supplied to die head 12 increases and the amount of the slurry discharged from discharge port 12a increases temporarily, so that the application thickness is instantaneously prone to increase. In this example, to prevent this, shortly after the slurry, which has been pushed by the movement of valve plug 130, reaches discharge port 12a of die head 12 through pipe 504, die head 12 moves to the second position where the interval between positive electrode current collector 3 and die head 12 is maximized. Thereby, it is possible to prevent or reduce a partial increase in the thickness of thick-layer portion 2b in the vicinity of thin-layer portion 2a. Incidentally, also at the outer edge portion of thin-layer portion 2a that is initially applied, the application thickness is instantaneously prone to increase, but the partial increase in the thickness does not matter much, because of a portion that does not contribute to the capacity of the battery. However, the sum of the thickness of the portion of thin-layer portion 2a where the thickness is increased in this way and the thickness of insulating tape 40 that is disposed thereon is set to equal to or less than the thickness of thick-layer portion 2b.

Thick-layer portion 2b having a predetermined length is formed by the transition from the formation of thin-layer portion 2a to the formation of thick-layer portion 2b in this way, and then valve plug 130 is moved to abut on valve seat 132, and coating valve 13 is rapidly closed. Thereby, a negative pressure is generated in pipe 504 on the downstream side from valve seat 132, and the slurry to be discharged from discharge port 12a can be instantaneously eliminated. Thus, switching is immediately performed from the application portion of positive electrode active material layer 2 to the non-application portion. The formation of the application portion and the non-application portion is repeated, and thereafter, by drying, electrode active material layers 2 are intermittently formed. After positive electrode active material layer 2 is formed on both surfaces or on one surface of positive electrode current collector 3, insulating tape 40 is attached across the non-application portion and the thin-layer portion. Positive electrode current collector 3 on which positive electrode active material layers 2 are formed is cut along virtual cutting lines 90 shown in FIG. 7a, and thereby, positive electrodes 1 shown in FIG. 7b are obtained.

<Negative Electrode>

Graphite whose surface was coated with an amorphous material was used as the negative electrode active material, PVdF was used as a binder, and slurry in which a mixture of these materials was dispersed in an organic solvent was prepared. The slurry was intermittently applied on a copper foil having a thickness of 15 µm that is negative electrode current collector 8, negative electrode active material layers 7 were formed by drying and were pressed such that the thickness on one surface of the current collector was 55 µm. In this example, negative electrode active material layer 7 had a uniform thickness, neither step nor incline of negative electrode active material layer 7 was formed at the border between the application portion and the non-application portion, and the insulating member was not attached. Negative electrode current collector 8 on which negative electrode active material layers 7 were formed was cut, and thereby, negative electrodes 6 were obtained.

<Making of Laminated-Type Secondary Battery>

Positive electrodes 1 and negative electrodes 6 produced as described above were laminated with separators 20 made of polypropylene having a thickness of 25 µm interposed therebetween, negative electrode terminal 16 and positive electrode terminal 11 were connected to the electrodes, and the resultant assembly was accommodated in an outer container formed of flexible film 30, so that a laminated-type secondary battery having a thickness of 8 mm shown in FIG. 1 was obtained.

Example 2

An air cylinder was used instead of the motor, as the drive device of valve plug 130 of coating valve 13 in the production apparatus of positive electrode 1. All the other conditions were the same as those in Example 1, and thereby, a laminated-type secondary battery was obtained.

Comparative Example 1

The interval between discharge port 12a of die head 12 and positive electrode current collector 3 in the production apparatus of positive electrode 1 was fixed to a constant value at all times, and the slurry was discharged from discharge port 12a while the interval between discharge port 12a and positive electrode current collector 3 was kept constant both at the time of the formation of thick-layer portion 2a and at the time of the formation of thin-layer portion 2b. An air cylinder was used instead of the motor, as the drive device of valve plug 130 of coating valve 13 in the production apparatus of positive electrode 1. All the other conditions were the same as those in Example 1, and thereby, a laminated-type secondary battery was obtained.

(Evaluation)

Table 1 shows the result of evaluating and averaging the thicknesses and cycle characteristics of each of ten laminated-type secondary batteries in Examples 1, 2 and Comparative Example 1 that were produced as described above. This reveals that the laminated-type secondary batteries in Examples 1, 2 had smaller thicknesses and more suitable cycle characteristics than the laminated-type secondary batteries in Comparative Example 1.

TABLE 1

| | Thickness of battery (mm) | Capacity retention rate (%) after 500 cycles, 25° C. |
|---|---|---|
| Example 1 | 7.7 | 96 |
| Example 2 | 7.7 | 96 |
| Comparative Example 1 | 8.0 | 94 |

A specific example of the timing of the opening and closing of coating valve 13 and the time when the die head in the above-described Examples 1, 2 starts to move will be described in more detail. The following description relates to a production method of positive electrode 1, but negative electrode 6 can be also produced in the same way as positive electrode 1.

In the production apparatus shown in FIG. 8, at the time of the formation of the non-application portion, current collector 3 moves so as to pass through a position facing die head 12, in a state where the interval between die head 12 and current collector 3 is small and where coating valve 13 is closed. Then, after the current collector having a desired length moves and the non-application portion is formed, coating valve 13 starts to open. However, at this time point, die head 12 has moved neither in the direction of moving close to current collector 3 nor in the direction of moving away from current collector 3, and die head 12 is kept at the first position where the interval from current collector 3 is small. Then, when a predetermined time (for example, 44 msec) has elapsed since coating valve 13 started to open, die head 12 starts to move in the direction of moving away from current collector 13. Accordingly, right after the formation of the non-application portion is completed, die head 12 is at the first position close to current collector 3, coating valve 13 is gradually opened, and the amount of slurry 10 that is supplied is gradually increased. Then, while coating valve 13 continues to open, die head 12 starts to be move, and is caused to be positioned away from current collector 3 gradually. Then, eventually, coating valve 13 is completely opened, and die head 12 arrives at the second position away from current collector 3. That is, in this example, the movement of die head 12 is started after a short time lag from the time when coating valve 13 starts to open, and thereby, it is possible to reduce the risk of the occurrence of the failure (particularly, a pinhole) of the active material layer.

If coating valve 13 is rapidly opened, the pressure of slurry 10 that is supplied to die head 12 rapidly increases, the discharge amount increases instantaneously, and there is a possibility that a protrusion is formed at the start edge portion of thin-layer portion 2a. Therefore, it is preferable that coating valve 13 is opened relatively slowly. Then, after coating valve 13 starts to open, die head 12 starts to move so as to be away from current collector 3, at a time that is appropriately set to the middle opening point at which coating valve 13 continues to open. Eventually, coating valve 13 is fully opened, and die head 12 arrives at a predetermined second position away from coating valve 13. Whether to complete the full opening of coating valve 13 earlier or to complete the arrival of die head 12 at the second position earlier does not matter. Thus, by the timing difference between the start of the opening action of coating valve 13 and the start of the movement of die head 12 in the direction of moving away from current collector 3, it is possible with certainty to form thin-layer portion 2a such that the entire thickness of electrode 1 does not increase even when insulating member 40 or the like is provided, and further, it is possible to prevent the generation of a pinhole in thin-layer portion 2a and the generation of an unintended protrusion at the border portion between thin-layer portion 2a and thick-layer portion 2b or in the vicinity. It is preferable that the speed of coating valve 13 from the start of opening to completion of opening be relatively low and that the speed of the movement of die head 12 from the first position close to current collector 3 to the second position away from current collector 3 be relatively high.

Particularly, in a configuration in which active material layer 2 is formed on both surfaces of current collector 3, this method is effective in the case where active material layer 2 is formed on one surface of current collector 3 and thereafter active material layer 2 is formed on the other surface. That is, when active material layer 2 (thin-layer portion 2a and thick-layer portion 2b) is formed on one surface of current collector 3 in a step shown in FIG. 9a and thereafter current collector 3 is conveyed by back roll 600 such that the other surface faces die head 12, there is a possibility that portions corresponding to the back sides of the non-application portion and thin-layer portion 2a are farther away from die head 12 than a portion corresponding to the back side of thick-layer portion 2b, as shown in FIG. 9b. Further, as shown in FIG. 9c, in the case where current collector 3 moves in a state where the portions corresponding to the back sides of the non-application portion and thin-layer portion 2a are not in contact with back roll 600 without any tight contact, there is a possibility that the portions corresponding to the back sides of the non-application portion and thin-layer portion 2a may move away from die head 12 by being pushed by slurry 10 that is discharged from die head 12. As a result, slurry 10, when the degree at which coating valve 13 is open is small and the discharge amount is small, does not fully reach current collector 3, and there is a possibility that a pinhole will be generated at thin-layer portion 2a or at the border portion between thin-layer portion 2a and thick-layer portion 2b. In contrast, when the interval between die head 12 and back roll 600 is previously reduced in consideration of moving of the portions corresponding to the back sides of the non-application portion and thin-layer portion 2a away from die head 12, the portion corresponding to the back side of thick-layer portion 2a is too close to die head 12, and there is a possibility that foil current collector 3 will be broken by being pushed by the discharged slurry 10. Thus, the optimal interval between die head 12 and back roll 600 is in a very narrow range (nearly one point). Therefore, it is necessary to adjust the interval for each production lot, and the method is unsuitable for mass production.

Hence, as described above, after a predetermined time (44 msec) has elapsed since the start of the opening of coating valve 13, die head 12 starts to move from the first position to the second position so as to be away from back roll 600. FIGS. 10a to 10c schematically show a formation step of active material layer 2 in the case where current collector 3 moves in a state where a part of current collector 3 is not contact with back roll 600 as shown in FIG. 9c. When coating valve 13 starts to open in the state where die head 12 is at the first position close to back roll 600 as shown in FIG. 10a, a small amount of slurry 10, initially, is supplied to die head 12, and is discharged from die head 12 toward current collector 3, and therefore, thin-layer portion 2a is formed on current collector 3, as shown in FIG. 10b. Then, when die head 12 moves away from back roll 600 while coating valve 13 is open, a large amount of slurry 10 is supplied to die head 12, and is discharged from die head 12 toward current collector 3, and thick-layer portion 2b is formed on current collector 3, as shown in FIG. 10c. Eventually, as shown in FIG. 11, positive electrode 1 in which active material layer 2 including thin-layer portion 2a and thick-layer portion 2b is formed on both surfaces of current collector 3 is completed.

Further, FIGS. 12a to 12c schematically show a formation step of active material layer 2 when current collector 3 moves in a state where current collector 3 closely makes contacts with back roll 600 as shown in FIG. 9b. When coating valve 13 starts to open in the state where die head 12 is at the first position close to back roll 600 as shown in FIG. 12a, thin-layer portion 2a is formed on current collector 3, as shown in FIG. 12b. Then, when die head 12 moves away from back roll 600 while coating valve 13 is open, thick-layer portion 2b is formed on current collector 3, as shown in FIG. 12c, and positive electrode 1 shown in FIG. 11 is completed.

FIGS. 13a and 13b show graphs showing the action of coating valve 13 and the action of die head 12 in the formation step of active material layer 2. FIGS. 13a and 13b show the position of valve plug 130 (see FIG. 4) of coating valve 13. In this example, the stroke of valve plug 130 and shaft 131 is 2 mm. In the case where valve plug 130 completely blocks through-hole 132a of valve seat 132, the distance is 0 mm, and in the case where valve plug 130 moves away from valve seat 132 and completely opens through-hole 132a, the distance is 2.0 mm. Further, FIGS. 13a and 13b show the interval (gap) between die head 12 and back roll 600. Specifically, each of gaps at both side portions on the surface of die head 12 that faces back roll 600 is measured. As described later, in die head 12, a drive mechanism is attached at each of both side portions on the surface that faces back roll 600, and there is sometimes a little difference between the gaps at both side portions. In the example shown in FIG. 13a, the gap when die head 12 is at the first position close to back roll 600 is about 190 µm, and the gap when die head 12 is at the second position away from back roll 600 is about 230 µm. In the example shown in FIG. 13b, the gap when die head 12 is at the first position close to back roll 600 is about 180 µm, and the gap when die head 12 is at the second position away from back roll 600 is about 230 µm. In each of the two examples shown in FIGS. 13a and 13b, at a time point when 44 msec has elapsed since the time point (about 100 msec) of the start of the opening of coating valve 13, die head 12 starts to move from the first position to the second position, and moves away from back roll 600. The time during which die head 12 moves from the first position to the second position is 52 msec.

Next, drive means 19 for moving die head 12 between the first position close to back roll 600 and the second position away from back roll 600 will be described with reference to FIGS. 14 and 15. Drive mechanisms 19a, 19b are respectively provided at both side portions on the surface of die head 12 facing back roll 600 which holds a part of current collector 3 and that faces back roll 600. In each of drive mechanisms 19a, 19b, LM guide 22 is attached to support 21 that supports die head 12, and block 23 that is capable of moving along LM guide 22 is provided. Block 23 is attached to ball screw 25 that can be rotated by motor 24. Further, block 23 has inclined surface 23a, and head 26a of the shaft of air cylinder 26 abuts on inclined surface 23a. Furthermore, LM guide 27 and linear scale 28 are provided along the shaft of air cylinder 26. Because of such a configuration, when motor 24 rotates ball screw 25, block 23 attached to ball screw 25 moves vertically along LM guide 22. When block 23 moves vertically, air cylinder 26 including head 26a that abuts on inclined surface 23a moves along LM guide 27 while following inclined surface 23a, and thereby, support 21 and die head 12 move in the direction of moving close to back roll 600 or in the direction of moving away from back roll 600.

Incidentally, also in the second exemplary embodiment in which die head 12 is turned, when die head 12 starts to be turned and starts to move so as to be away from back roll 600 after a predetermined time has elapsed since the start of the opening of coating valve 13, the effect of preventing or reducing the generation of a pinhole or protrusion in the active material layer as described above is obtained.

Thus, the present invention has been described with reference to some exemplary embodiments, but the present invention is not limited to the above configurations of the exemplary embodiments, and various modifications that can be understood by those skilled in the art can be performed in the configuration and detail of the present invention, within the scope of the technical idea of the present invention.

The invention claimed is:

1. A production method of an electrode for a secondary battery, the secondary battery including an electrode laminated assembly that has a configuration in which electrodes and a separator are laminated, wherein
said electrode includes a current collector and an active material layer formed on a surface of said current collector,
said active material layer includes a thick-layer portion and a thin-layer portion that is positioned at an edge portion of said active material layer and that is smaller in thickness than the thick-layer portion, and is formed by discharging slurry containing an active material from a discharge port of a die head toward the surface of said current collector, the slurry being supplied to said die head through a coating valve, and
at the time of forming the thin-layer portion of said active material layer, the slurry supplied through said coating valve having a smaller opening than at the time of forming the thick-layer portion is discharged toward said current collector from the discharge port that is closer to said current collector than at the time of forming the thick-layer portion.

2. The production method of the electrode for the secondary battery according to claim 1, wherein at the start of the formation of said active material layer, the thin-layer portion is formed by discharging a small amount of the slurry supplied through said coating valve which is open to a small degree, toward said current collector, from the discharge port with a small interval from said current collector, and after the formation of the thin-layer portion, the thick-layer portion is formed by increasing the interval between the discharge port and said current collector, degree to which said coating valve is open is increased, and then discharging a large amount of the slurry supplied through said coating valve, toward said current collector.

3. The production method of the electrode for the secondary battery according to claim 2, wherein after the formation of the thin-layer portion, the interval between the discharge port and said current collector is increased and then the degree to which said coating valve is open is increased.

4. The production method of the electrode for the secondary battery according to claim 1, wherein said coating valve includes a valve seat that has a through-hole, and a valve plug that can abut on the valve seat and that can move away from the valve seat, and at the time of the formation of the thin-layer portion of said active material layer, the degree to which said coating valve is open is decreased by decreasing the interval between the valve plug and the valve seat.

5. The production method of the electrode for the secondary battery according to claim 1, wherein
in a state where said coating valve is closed and the slurry is not discharged from said die head, said coating valve is open, and the discharge of the slurry from said die head to said current collector is started, and
after a predetermined time has elapsed since the start of the opening of said coating valve, said die head start to move so as to be away from said current collector.

6. The production method of the electrode for the secondary battery according to claim 5, wherein the thin-layer portion is formed in a period after said coating valve starts to open and before said die head starts to move so as to be away from said current collector.

7. A production method of an electrode for a secondary battery, the secondary battery including an electrode laminated assembly that has a configuration in which electrodes and a separator are laminated, wherein
said electrode includes a current collector and an active material layer formed on a surface of said current collector,
said active material layer includes a thick-layer portion and a thin-layer portion that is positioned at an edge portion of said active material layer and that is smaller in thickness than the thick-layer portion, and is formed by discharging slurry containing an active material from a discharge port of a die head toward the surface of said current collector, the slurry being supplied to said die head through a coating valve, and
at the time of forming the thin-layer portion of said active material layer, a smaller amount of slurry, than at the amount applied when the thick-layer portion is formed, is discharged toward said current collector from the discharge port that is closer to said current collector than at the time of the formation of the thick-layer portion by changing an angle of said die head to said current collector.

8. The production method of the electrode for the secondary battery according to claim 7, wherein said die head is provided so as to be able to be turned, and an interval between the discharge port and said current collector is increased by turning said die head in transitional time from the formation of the thin-layer portion to the formation of the thick-layer portion.

9. The production method of the electrode for the secondary battery according to claim 8, wherein
in a state where said coating valve is closed and the slurry is not discharged from said die head, said coating valve is opened and the discharge of the slurry from said die head to said current collector is started, and
after a predetermined time has elapsed since the start of the opening of said coating valve, said die head starts to be turned.

10. The production method of the electrode for the secondary battery according to claim 9, wherein the thin-layer portion is formed in a period after said coating valve starts to open and before said die head starts to be turned.

11. The production method of the electrode for the secondary battery according to claim 1, wherein said coating valve is closed during formation of a non-application portion where said active material layer is not present on the surface of said current collector.

12. The production method of the electrode for the secondary battery according to claim 1, wherein a length of a transition portion is 1 mm or less, the transition portion being positioned between the thin-layer portion and the thick-layer portion.

* * * * *